(12) United States Patent
Zhang et al.

(10) Patent No.: US 11,671,845 B2
(45) Date of Patent: Jun. 6, 2023

(54) DYNAMIC SPECTRUM SHARING METHOD BASED ON USER ONLINE LEARNING AND LOW-OVERHEAD COOPERATION

(71) Applicant: NATIONAL UNIVERSITY OF DEFENSE TECHNOLOGY, Jiangsu (CN)

(72) Inventors: Jianzhao Zhang, Nanjing (CN); Fuqiang Yao, Nanjing (CN); Linghui Zeng, Nanjing (CN); Yongxiang Liu, Nanjing (CN)

(73) Assignee: NATIONAL UNIVERSITY OF DEFENSE TECHNOLOGY, Jiangsu (CN)

(*) Notice: Subject to any disclaimer, the term of this patent is extended or adjusted under 35 U.S.C. 154(b) by 0 days.

(21) Appl. No.: 17/796,194

(22) PCT Filed: Aug. 20, 2021

(86) PCT No.: PCT/CN2021/113779
§ 371 (c)(1),
(2) Date: Jul. 28, 2022

(87) PCT Pub. No.: WO2022/037676
PCT Pub. Date: Feb. 24, 2022

(65) Prior Publication Data
US 2023/0078242 A1 Mar. 16, 2023

(30) Foreign Application Priority Data
Aug. 20, 2020 (CN) .......................... 202010840764.7

(51) Int. Cl.
*H04L 12/28* (2006.01)
*H04W 16/14* (2009.01)
*H04J 1/16* (2006.01)

(52) U.S. Cl.
CPC .................................. *H04W 16/14* (2013.01)

(58) Field of Classification Search
CPC ............. H04W 16/14; H04W 72/0446; H04W 72/0453
(Continued)

(56) References Cited

U.S. PATENT DOCUMENTS

| 2008/0112359 A1* | 5/2008 | Cleveland | H04W 16/14 370/329 |
| 2016/0088486 A1* | 3/2016 | Taher | H04W 16/14 455/454 |

(Continued)

FOREIGN PATENT DOCUMENTS

| CN | 103957528 A | 7/2014 |
| CN | 105592563 A | 5/2016 |

(Continued)

OTHER PUBLICATIONS

International Search Report for PCT/CN2021/113779 dated Nov. 19, 2021 (6 pages).

(Continued)

*Primary Examiner* — John Pezzlo (57) ABSTRACT

A dynamic spectrum sharing method based on user online learning and low-overhead cooperation is provided. In the method, a secondary user (SU) obtains spectrum sharing scene information and requirement parameters; then initializes state parameters and spectrum sensing parameters of a channel. At the beginning of each slot, the SU determines whether a direct transmission condition is met according to the transmission condition of the previous slot, and directly continues transmission on the channel of the previous slot or obtains an idle channel according to the channel state and spectrum sensing for transmission, and updates state parameter and spectrum sensing parameter. Finally, an SU base station performs conflict coordination according to the chan- (Continued)

nel occupancy condition for a fixed number of slots. Hence, low-overhead and efficient spectrum sharing is realized by the SU learning the channel state and the transmission condition, such that the spectrum utilization rate in a high user density and dynamic spectrum environment can be effectively improved.

14 Claims, 4 Drawing Sheets

(58) Field of Classification Search
USPC .................................. 370/252, 329, 430, 442
See application file for complete search history.

(56) References Cited

U.S. PATENT DOCUMENTS

| | | | |
|---|---|---|---|
| 2018/0219712 A1* | 8/2018 | Terry | .................. H04J 13/0018 |
| 2018/0324595 A1 | 11/2018 | Shima | |
| 2019/0191314 A1* | 6/2019 | Mueck | .................. H04W 16/14 |
| 2022/0400386 A1* | 12/2022 | Furuichi | ................ H04W 16/14 |

FOREIGN PATENT DOCUMENTS

| CN | 111262638 A | 6/2020 |
|---|---|---|
| CN | 111935722 A | 11/2020 |

OTHER PUBLICATIONS

Liu, Liu et al. "CR-NOMA (Dynamic Spectrum Sharing Model and Allocation Algorithm for CR-NOMA)," Communications Technology, vol. 52, No. 11, Nov. 30, 2019 (6 pages).

\* cited by examiner

DYNAMIC SPECTRUM SHARING METHOD BASED ON USER ONLINE LEARNING AND LOW-OVERHEAD COOPERATION

CROSS REFERENCE TO RELATED APPLICATION

This present patent application is a § 371 national phase application of Intl. Appln. No. PCT/CN2021/113779, which claims the benefit and priority of Chinese Patent Application No. 202010840764.7, entitled DYNAMIC SPECTRUM SHARING METHOD BASED ON USER ONLINE LEARNING AND LOW-OVERHEAD COOPERATION filed on Aug. 20, 2020, the disclosure of each of which is incorporated by reference herein in its entirety as part of the present application.

TECHNICAL FIELD

The present disclosure relates to the field of electromagnetic spectrum technologies, and specifically, to a dynamic spectrum sharing method based on user online learning and low-overhead cooperation.

BACKGROUND ART

The wireless communication network has become one of the most important infrastructures of modern information society. As the number of users and bandwidth requirement grow rapidly, and the wireless spectrum, as the core resource supporting the wireless network, is a limited and scarce reusable resource, it is difficult for a new application to obtain the spectrum and the allocated spectrum cannot be fully underutilized. In the shortwave band with limited frequency resources, the frequency competition and power competition among the users have aggravated the deterioration of shortwave electromagnetic environment due to the increasing quantity of users and operating power, which decreases the actual spectrum utilization and band availability, and thus an efficient spectrum sharing method is needed. In the mobile communication band, the International Telecommunication Union has initiated research for 2030 and future 6G, and considering that 6G requires a 50-fold increase over 5G peak rate of 20 Gbit/s, as well as a 10-fold increase in user experience rate and a 10-fold increase in spectrum efficiency over 5G, a more efficient spectrum sharing method is also needed. Therefore, dynamic and intelligent spectrum sharing based on the flexible and intelligent spectrum access capability of user equipment has become one of the fundamental ways to resolve spectrum scarcity and to significantly reduce delay and power consumption and improve rate performance of the wireless communication system.

The basic concept of dynamic spectrum sharing is to allow heterogeneous terminals with different priorities to share the same spectrum. Due to policies and spectrum licenses, the basis and prerequisite for spectrum sharing among secondary users (SUs) who do not have access to spectrum resources and primary users (PUs) who own the spectrum are that the spectrum access of the SUs does not cause harmful interference to the PUs who own the spectrum rights; and effective coordination and cooperation mechanisms are needed among the SUs to reduce spectrum access conflicts. The spectrum sharing of future wireless communication networks shall apply to scenarios with high user density, high bandwidth demand, and complex mutual interference. In these scenarios, it is difficult for the SUs to establish a universal channel availability model due to the complex and variable channel availability, and the determination on an available channel and overhead of the determination are key challenges to the SUs. In addition, due to the high user density (for example, mobile communications) or the large impact of spectrum usage (for example, shortwave stations with medium and high power), effective collaboration among the SUs is also required to reduce spectrum usage conflicts, and such collaboration should be achieved at the cost of lower time and fewer spectrum resources due to the complex spectrum environment and limited spectrum resources. Currently, no effective method has been found to resolve these problems.

Dynamic spectrum sharing in future wireless communication networks faces problems such as difficulties in obtaining accurate channel availability due to dynamic changes in PU distribution and channel occupancy, large number of SUs and difficulties in collaboration. In this case, an effective dynamic spectrum sharing method needs to be studied to achieve efficient spectrum sharing.

SUMMARY

The purpose of the present disclosure is to provide a dynamic spectrum sharing method based on user online learning and low-overhead cooperation, to mainly resolve the problem how a plurality of SUs select channels based on channel competition and adjust spectrum sensing strategies based on activities of PUs, thereby achieving efficient spectrum sharing.

In order to achieve the above objective, the present disclosure provides the following technical solutions:

A dynamic spectrum sharing method based on user online learning and low-overhead cooperation includes:

S1: obtaining, by a secondary user (SU), scenario information and requirement parameters of spectrum sharing, wherein obtaining, by the SU, the scenario information of spectrum sharing comprises: obtaining, by the SU, a sharable channel set M={1, ..., M}, a SU set N={1, ..., N} participating in spectrum sharing, a quantity L of candidate channels of each SU, a time $\tau$ required to sense each channel, and an interval $T_1$ at which the SU reports a channel usage to a secondary user base station (SUBS); and the requirement parameters comprise a spectrum usage conflict probability threshold $\eta$ of the SU and a channel conflict adjustment parameter $\varphi$;

S2: initializing, for each SU, state parameters and spectrum sensing parameters of each channel m∈M, wherein the state parameters of the channel comprise a first channel state parameter $\alpha_m$ and a second channel state parameter $\beta_m$, and the spectrum sensing parameters comprise a quantity $\kappa_m$ of slots skippable for channel sensing and a quantity $l_m$ of remaining slots skippable for channel sensing;

S3: at a beginning of each slot, determining, by the SU, whether a direct transmission condition is met based on a transmission status of a previous slot; and continuing transmission directly on a channel of the previous slot when the direct transmission condition is met; or obtaining an idle channel for transmission based on a channel state and spectrum sensing when the direct transmission condition is not met, wherein obtaining the idle channel for transmission based on the channel state and spectrum sensing when the direct transmission condition is not met comprises:

S31: calculating, by the SU, a current priority of each channel according to a formula $$P_{m,t} = \overline{x_{m,t}} + c\sqrt{\frac{\ln t}{h_{m,t}}},$$

where $P_{m,t}$ indicates a priority parameter, t indicates a number of a current slot, $\overline{x_{m,t}}$ indicates an average throughput obtained when the SU selects a channel m in previous t−1 slots, $h_{m,t}$ indicates a quantity of times the channel m is selected by the SU, and c is a constant;

S32: arranging all channels in descending order of $P_{m,t}$ and taking first L channels as candidate channels of the SU;

S33: sequentially performing, by the SU, spectrum sensing on the L candidate channels one by one, until the idle channel is obtained; obtaining a channel occupancy estimation parameter θ of a primary user (PU) through random sampling in a Γ distribution $\Gamma(\alpha_m, \beta_m)$ based on current values of the first channel state parameter $\alpha_m$ and the second channel state parameter $\beta_m$; and calculating the quantity $\kappa_m$ of slots skippable for channel sensing, wherein $\kappa_m$ is calculated by $$\kappa_m = \left\lceil \frac{1}{2T_0}\left(\frac{1}{\min(\theta, \alpha_m/\beta_m)}\right) \right\rceil,$$

wherein $\lceil \bullet \rceil$ indicates an upward rounding function, min(•) indicates a function for finding a smaller value, and $T_0$ indicates a slot length;

S34: setting $l_m = \kappa_m$ and performing, by the SU, transmission on the obtained idle channel; and S35: skipping, by the SU, transmission, when no idle channel is sensed among the L candidate channels, and attempting transmission in a next slot;

S4: updating the state parameters and the spectrum sensing parameters of the channel; and S5: reporting, by each SU, a channel occupancy status to the SUBS every $T_1$ slots, and performing, by the SUBS, conflict coordination based on the channel occupancy status.

Preferably, in the step S2, initializing the state parameters of each channel m∈M, includes:

setting the first channel state parameter $\alpha_m = 1$;

setting the second channel state parameter $\beta_m = T_0$, where $T_0$ indicates the slot length;

initializing the spectrum sensing parameters of each channel m∈M includes:

setting the quantity of slots skippable for channel sensing $\kappa_m = 0$; and setting the quantity of remaining slots skippable for channel sensing $l_m = 0$.

Preferably, in the step S3, determining, by the SU, whether the direct transmission condition is met based on the transmission status of the previous slot, includes:

determining that the direct transmission condition is met when the SU performs transmission successfully on a channel in the previous slot and the quantity $l_m$ of remaining slots skippable for channel sensing is greater than or equal to 1; otherwise, determining that the direct transmission condition is not met.

Preferably, in the step S3, continuing transmission directly on the channel of the previous slot when the direct transmission condition is met, includes:

setting the parameter $l_m = l_m − 1$, and directly selecting, by the SU, the channel of the previous slot for transmission.

Preferably, in the step S4, updating the state parameters and the spectrum sensing parameters of the channel when continuing transmission directly on the channel of the previous slot when the direct transmission condition is met in the step S3, includes:

when the transmission succeeds and $l_m = 0$, setting $\beta_m = \beta_m + \kappa_m T_0$;

when the transmission succeeds and $l_m \neq 0$, skipping updating the state parameters of the channel; or when the transmission fails, setting $\alpha_m = \alpha_m + 1$, $\beta_m = \beta_m + (\kappa_m − 1)T_0 + 0.5T_0$, and $l_m = 0$;

where $\kappa_m$ is calculated by the formula $$\kappa_m = \left\lceil \frac{1}{2T_0}\left(\frac{1}{\min(\theta, \alpha_m/\beta_m)}\right) \right\rceil$$

after obtaining the channel occupancy estimation parameter θ of the PU through random sampling in the Γ distribution $\Gamma(\alpha_m, \beta_m)$ based on the current values of the first channel state parameter $\alpha_m$ and the second channel state parameter $\beta_m$.

Preferably, in the step S4, updating the state parameters and the spectrum sensing parameters of the channel when obtaining the idle channel for transmission based on the channel state and spectrum sensing when the direct transmission condition is not met in the step S3, includes:

when the transmission succeeds, setting $\beta_m = \beta_m + \kappa_m T_0$, and $l_m = l_m − 1$; or when the transmission fails, setting $l_m = \kappa_m = 0$, $\alpha_m = \alpha_m + 1$, and $\beta_m = \beta_m + (\kappa_m − 1)T_0 + 0.5T_0$.

Preferably, in the step S5, performing, by the SUBS, the conflict coordination based on the channel occupancy status may include:

adjusting, by the SUBS, a return value of the channel to the SU based on the channel occupancy status; and when a probability of a channel being occupied by two or more SUs at the same time in $T_1$ slots is greater than the conflict probability threshold η, decreasing average return values by φ for the SUs selecting the channel except an SU with a largest average return value, and feeding back a new return value to each SU.

Preferably, in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

According to the specific embodiments provided in the present disclosure, the present disclosure discloses the following technical effects:

(1) According to the present disclosure, through a small amount of cooperative overhead of a plurality of SUs, coordination of competition can be achieved when different SUs access the channel, which reduces the spectrum resource wastes caused by channel competition while ensuring that an SU, who can obtain the maximum throughput, gets the right to use the channel.

(2) According to the present disclosure, after obtaining the idle channel, the SU can estimate the remaining idle time of the channel by learning the channel state parameters online, thus avoiding unnecessary spectrum sensing by the SU at the beginning of each slot, thereby significantly improving the idle spectrum utilization.

(3) The channel state learning and utilization mechanism designed in the present disclosure is easy to implement and has low overhead, which is convenient for application in practical systems.

BRIEF DESCRIPTION OF THE DRAWINGS

To describe the technical solutions of the embodiments of the present disclosure or the prior art more clearly, the accompanying drawings required for the embodiments are briefly described below. Apparently, the accompanying drawings described below show merely some embodiments of the present disclosure, and persons of ordinary skill in the art may still derive other accompanying drawings from these accompanying drawings without creative efforts.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other examples obtained by persons of ordinary skill in the art based on the examples of the present disclosure without creative efforts shall fall within the protection scope of the present disclosure.

The purpose of the present disclosure is to provide a dynamic spectrum sharing method based on user online learning and low-overhead cooperation, to mainly resolve the problem how a plurality of SUs select channels based on channel competition and adjust spectrum sensing strategies based on activities of PUs, thereby achieving efficient spectrum sharing.

To make the above-mentioned objective, features, and advantages of the present disclosure clearer and more comprehensible, the present disclosure will be further described in detail below in conjunction with the accompanying drawings and specific embodiments.

Figure 1:
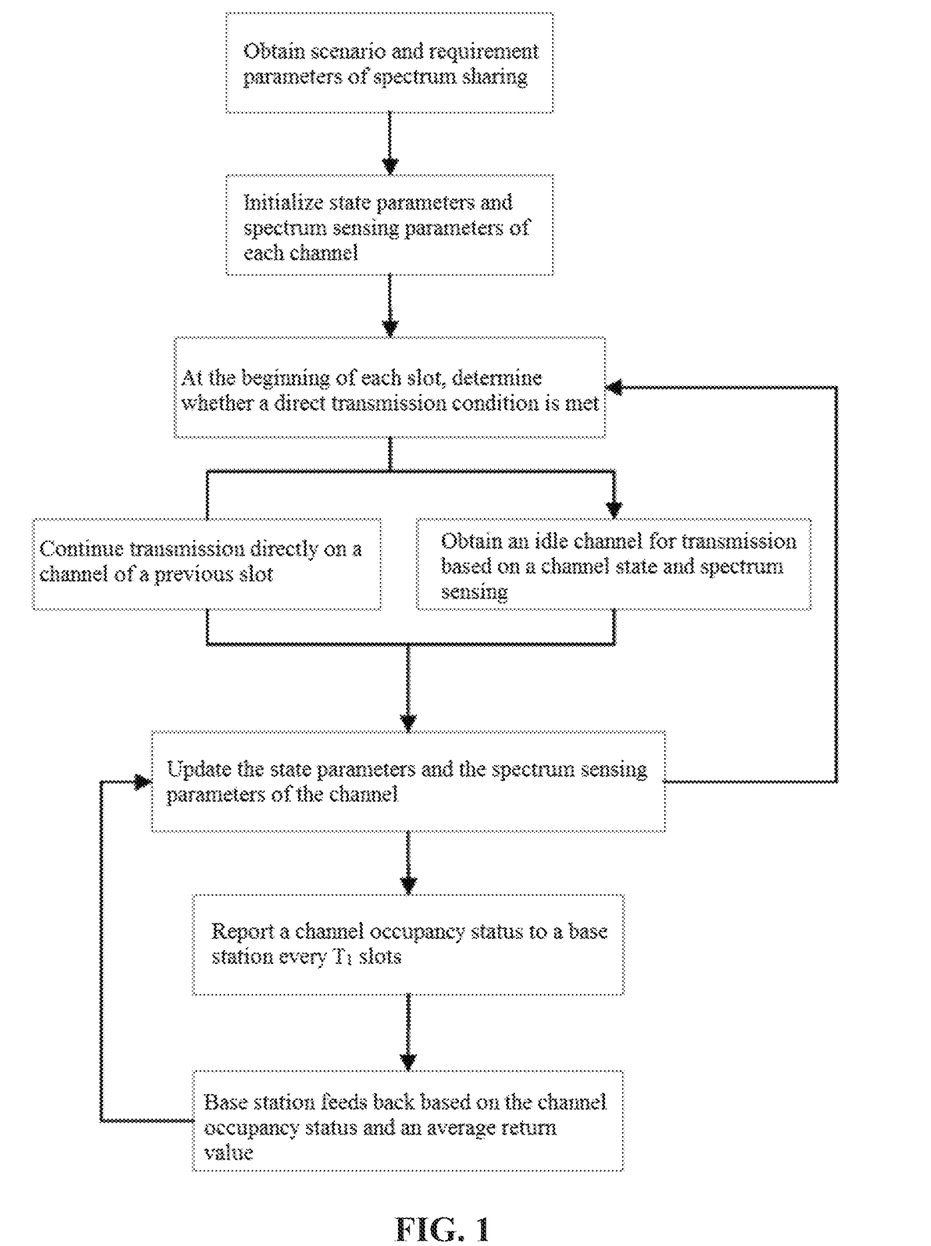
FIG. 1 is a flowchart illustrating a dynamic spectrum sharing method based on user online learning and low-overhead cooperation according to the present disclosure.

As shown in FIG. 1, the dynamic spectrum sharing method based on user online learning and low-overhead cooperation according to the present disclosure includes:

S1: An SU obtains scenario information and requirement parameters of spectrum sharing.

In this embodiment of the present disclosure, the SU obtains the scenario information of spectrum sharing may include: obtaining, by the SU, a sharable channel set M={1, ..., M}, an SU set N={1, ..., N} participating in spectrum sharing, a quantity L of candidate channels of each SU, a time τ required to sense each channel, and an interval $T_1$ at which the SU reports a channel usage to an SUBS; and the requirement parameters include a spectrum usage conflict probability threshold η of the SU and a channel conflict adjustment parameter φ. The quantity L of candidate channels of each SU is determined based on a channel occupancy status of the PU and an expected probability of obtaining an available channel by each access attempt, and the time τ required to sense each channel is determined based on a protection requirement of the PU and a sensing capability of the SU. It is noted that in the channel set M={1, ..., M}, M indicates the largest numbered channel, and M also indicates the quantity of channels in the channel set. Similarly, in the SU set N={1, ..., N}, N indicates the largest numbered SU, and N also indicates the quantity of SUs in the SU set.

Figure 2:
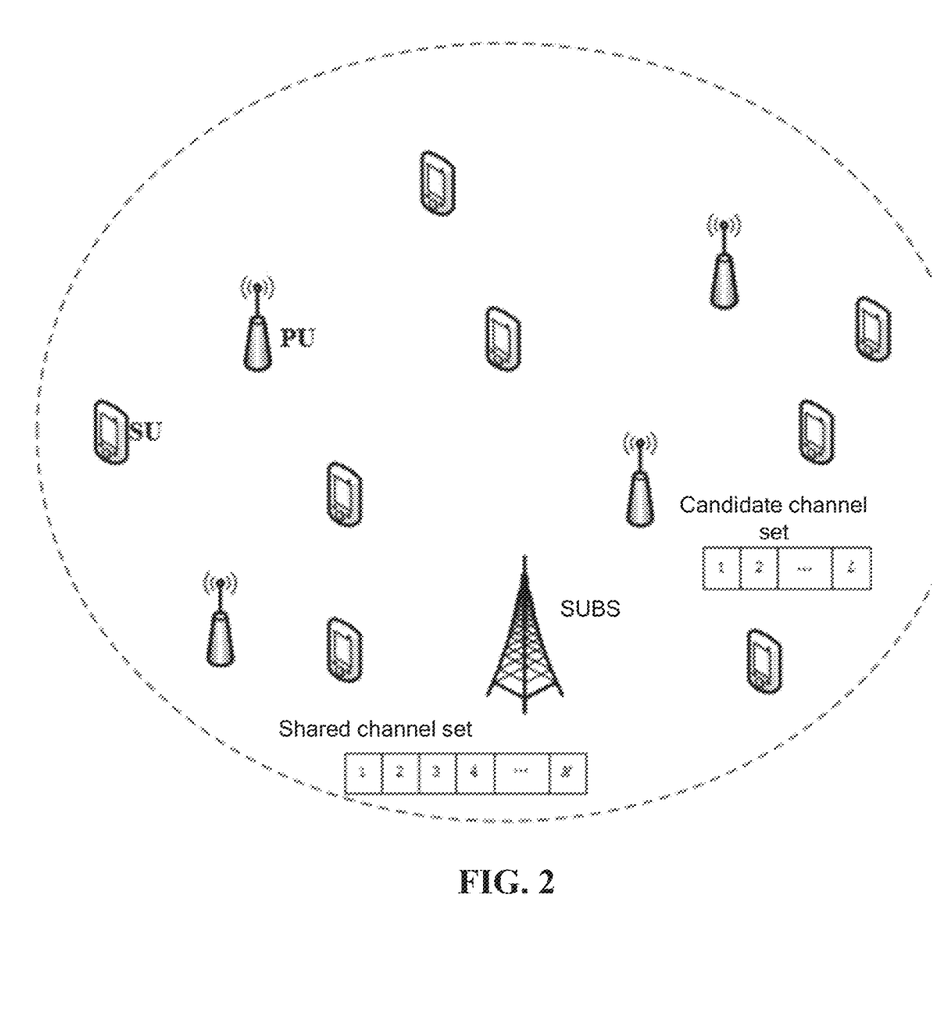
FIG. 2 is a schematic diagram of a spectrum sharing scenario.

FIG. 2 is a schematic diagram of a spectrum sharing scenario. There are a plurality of PUs, a plurality of SUs and one SUBS. The sharable channel set M={1, ..., M} is preferentially used by the PUs, and the SUs can access and use it without intolerable interference to the PUs. In actual sharing, the SUs need to know the status of the sharable channel. However, due to the large quantity and variability of the SUs, each SU does not need to know the status of the other SUs, but determines a channel competition status with the other SUs according to a determination whether the transmission succeeds or not.

Figure 3:
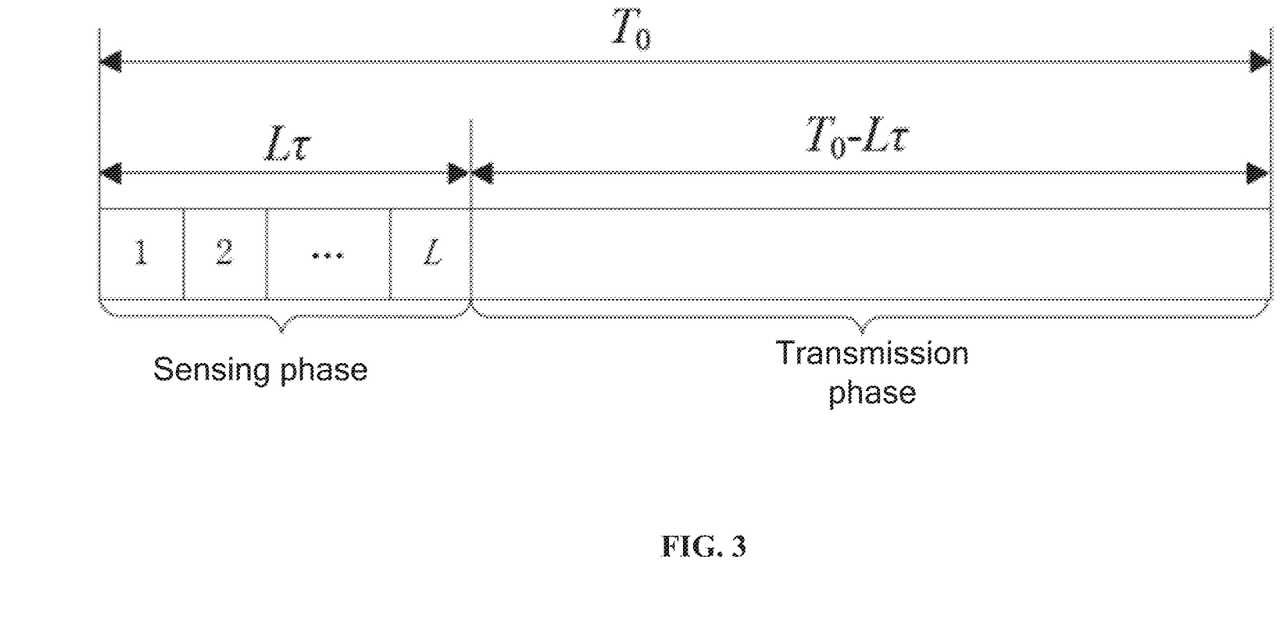
FIG. 3 is a diagram of a slot/frame structure of spectrum access by an SU.

FIG. 3 is a diagram of a slot/frame structure of spectrum access by each SU. In each slot, the SU senses at most L channels, and L is determined based on the channel occupancy status of the PU and the expected probability of obtaining the available channel by each access attempt. For example, in a case that the probability of channel occupancy by the PU is about 70% and the expected probability of obtaining the channel for each attempt is 80%, only about 5 channels need to be sensed to obtain an idle channel, i.e., L=5. The time required to sense each channel τ depends on the sensing capability of the SU and the protection requirement of the PU (for example, a detection probability), provided that the detection probability is not less than the probability required to protect the PU. Therefore, it can be seen from FIG. 3 that the duration of the sensing phase is $L_\tau$, that is, the product of L and τ, and the duration of the transmission phase is $T_0-L_\tau$.

The parameter $T_1$ is used to specify a period of coordination of channel occupancy competition by the SUBS, and its specific value may be estimated based on the quantity of users and the quantity of shareable channels in the area. The parameters η and φ are used to specify the degree of adjustment to channel conflict, and their specific parameter values may be about 10% and 20%.

S2: State parameters and spectrum sensing parameters of each channel m∈M are initialized for each SU, where the state parameters of the channel include a first channel state parameter $\alpha_m$ and a second channel state parameter $\beta_m$, and the spectrum sensing parameters include a quantity $\kappa_m$ of slots skippable for channel sensing and a quantity $l_m$ of remaining slots skippable for channel sensing.

It is noted that the SUs all belong to the SU set N={1, ..., N}. The first channel state parameter $\alpha_m$ indicates a quantity of selections for a particular channel, and the second channel state parameter $\beta_m$ indicates a time of successful transmission on the current channel.

Specifically, the state parameters of the channel m∈M are initialized by setting the first channel state parameter $\alpha_m=1$ and the second channel state parameter $\beta_m=T_0$. $T_0$ indicates a slot length. The spectrum sensing parameters of the channel m∈M are initialized by setting the quantity of slots skippable for the channel sensing $\kappa_m=0$ and the quantity of remaining slots skippable for the channel sensing $l_m=0$.

S3: At the beginning of each slot, the SU determines, based on a transmission status of a previous slot, whether a direct transmission condition is met, and continues transmission directly on a channel of the previous slot if the direct transmission condition is met, or obtains an idle channel for transmission based on a channel state and spectrum sensing if the direct transmission condition is not met.

Specifically, in this embodiment of the present disclosure, the method for determining, by the SU based on the transmission status of the previous slot, whether the direct transmission condition is met, includes: determining that the direct transmission condition is met if the SU performs transmission successfully on a channel in the previous slot and the quantity $l_m$ of remaining slots skippable for the channel sensing is greater than or equal to 1; otherwise, determining that the direct transmission condition is not met.

If the direct transmission condition is met, set $l_m=l_m-1$, and the SU directly selects the channel of the previous slot for transmission.

If the direct transmission condition is not met, the method for obtaining the idle channel for transmission based on historical channel selection and transmission status includes steps S31-S35.

S31: The SU calculates a current priority of each channel according to a formula $$P_{m,t} = \overline{x_{m,t}} + c\sqrt{\frac{\ln t}{h_{m,t}}},$$

where $P_{m,t}$ indicates a priority parameter, t indicates the number of a current slot, $\overline{x_{m,t}}$ indicates an average throughput obtained when the SU selects a channel m in previous t-1 slots, $h_{m,t}$ indicates a quantity of times the channel m is selected by the SU, and c is a constant. In a preferred embodiment of the present disclosure, $c=\sqrt{2}$. For example, when the current slot is the twentieth slot, t=20.

S32: All channels are sorted in descending order of $P_{m,t}$ and first L channels are taken as candidate channels of the SU.

S33: The SU performs spectrum sensing on the L candidate channels sequentially one by one, until an idle channel is obtained; a channel occupancy estimation parameter θ of a PU is obtained through random sampling in a Γ distribution $\Gamma(\alpha_m, \beta_m)$ based on current values of the first channel state parameter $\alpha_m$ and the second channel state parameter $\beta_m$; and the quantity $\kappa_m$ of slots skippable for sensing by the SU is calculated, where $\kappa_m$ is calculated by $$\kappa_m = \left\lceil \frac{1}{2T_0}\left(\frac{1}{\min(\theta, \alpha_m/\beta_m)}\right)\right\rceil,$$

where ⌈•⌉ indicates an upward rounding function, and min (•) indicates a function for finding a smaller value.

S34: Set $l_m=\kappa_m$ and the SU performs transmission on the obtained idle channel.

S35: The SU skips transmission if no idle channel is sensed among the L candidate channels, and attempts transmission in a next slot.

The reason for adopting the foregoing method lies in that the SU's spectrum detection before spectrum access in each slot, will cause unnecessary time waste because the PU may not use the channel for several consecutive slots. Therefore, each time an idle channel is detected, it is necessary to estimate the quantity of slots in which the PU's channel occupancy status does not need to be detected but communication is directly performed.

Taking the PU services following an exponential distribution as an example, the length of slots skippable for spectrum sensing is estimated, Bayesian analysis is used to estimate the remaining idle time of the channel, and in a case that θ indicates a channel idle time distribution parameter, i.e., the channel occupancy estimation parameter of the PU, the channel idle time satisfies $f(t)=\theta e^{-\theta t}$, and the average idle time is 1/θ.

Based on the probability theory, it can be known that the posterior probability is proportional to the likelihood probability and the prior probability. If the posterior distribution and the prior distribution belong to the same class, the prior distribution and the posterior distribution are referred to as conjugate distributions, and the prior distribution is referred to as the conjugate prior of the likelihood function. According to the common conjugate prior distribution, the conjugate prior distribution of exponential distribution follows the Γ distribution with parameters α and β, and the prior probability of θ is $$p(\theta) = \gamma(\theta \mid \alpha, \beta) = \frac{\beta^\alpha \theta^{\alpha-1} e^{-\beta\theta}}{\Gamma(\alpha)}.$$

x indicates the duration in which data does not experience conflict during transmission, and the function of x with respect to θ is the exponential distribution. Therefore, the posterior probability of θ is proportional to the likelihood probability and the prior probability, that is, $$\propto \frac{\beta^\alpha \theta^\alpha e^{-\theta(\beta+x)}}{\Gamma(\alpha)}.$$

That is, $p(\theta|x)=\gamma(\theta|\alpha+1,\beta+x)$. The goal of the system is to best estimate the idle time, to maximize the system spectrum utilization and minimize the system conflict. When there are K samples, the posterior probability of θ is $$p(\theta \mid x_1, K, x_K) = \gamma\left(\theta \mid \alpha + K, \beta + \sum_{k=1}^{K} x_k\right).$$

k indicates a serial number. Based on the probability theory, the posterior probability converges to near the maximum likelihood estimation as the quantity of samples increases. In addition, with an inspiration from the Optimistic Thompson sampling, larger values can be taken, which also makes the skipped values converge to the optimum faster. Therefore, for the parameters $\alpha_m$, $\beta_m$ and the slot length $T_0$, the quantity of skipped slots is calculated as follows:

$$\kappa_m = \left\lceil \frac{1}{2T_0}\left(\frac{1}{\min(\theta, \alpha_m/\beta_m)}\right)\right\rceil.$$

The parameter $\alpha_m$ indicates the quantity of selections for a particular channel. Since the SU can select any channel in the network, the SU may access the same channel for many times. The parameter $\alpha_m$ is updated only when a different channel is selected next time, or when a conflict occurs in the current channel. The parameter $\beta_m$ indicates the time of successful transmission on the current channel, and the feedback value for $\beta_m$ is reduced accordingly when a conflict is detected.

S4: The state parameters and the spectrum sensing parameters of the channel are updated.

When the transmission in a slot is completed, the parameters need to be updated to prepare for the next slot. Specifically, the method for updating the state parameters and the spectrum sensing parameters of the channel when continuing transmission directly on the channel of the previous slot if the direct transmission condition is met in the step S3 may include:

if the transmission succeeds and $l_m=0$, setting $\beta_m=\beta_m+\kappa_m T_0$;

if the transmission succeeds and $l_m \neq 0$, skipping updating the state parameters of the channel; or if the transmission fails, setting $\alpha_m=\alpha_m+1$, $\beta_m=\beta_m+(\kappa_m-1)T_0+0.5T_0$, and $l_m=0$.

Here, $\kappa_m$ is calculated by the formula $$\kappa_m = \left\lceil \frac{1}{2T_0}\left(\frac{1}{\min(\theta,\, \alpha_m/\beta_m)}\right)\right\rceil$$

after obtaining the channel occupancy estimation parameter $\theta$ of the PU through random sampling in the $\Gamma$ distribution $\Gamma(\alpha_m, \beta_m)$ based on the current values of the first channel state parameter $\alpha_m$ and the second channel state parameter $\beta_m$.

The method for updating the state parameters and the spectrum sensing parameters of the channel when obtaining an idle channel for transmission based on the channel state and spectrum sensing if the direct transmission condition is not met in the step S3 may include:

if the transmission succeeds, setting $\beta_m=\beta_m+\kappa_m T_0$ and $l_m=l_m-1$; or if the transmission fails, setting $l_m=\kappa_m=0$, $\alpha_m=\alpha_m+1$, and $\beta_m=\beta_m+(\kappa_m-1)T_0+0.5T_0$.

S5: Each SU reports, every $T_1$ slots, a channel occupancy status to the SUBS, and the SUBS performs conflict coordination based on the channel occupancy status.

Specifically, all the SUs report, every $T_1$ slots, the channel occupancy status of the previous $T_1$ slots to the SUBS, and the SUBS adjusts return values of the channel for the SUs based on the channel selection conflict; and if a probability of a channel being occupied by two or more SUs at the same time in the $T_1$ slots is greater than the conflict probability threshold $\eta$, average return values are decreased by $\varphi$ for the SUs selecting the channel except an SU with a largest average return value, and a new return value is returned to each SU.

According to the present disclosure, through a small amount of cooperative overhead of a plurality of SUs, coordination of competition can be achieved when different SUs access the channel, which reduces the spectrum resource wastes caused by channel competition while ensuring that an SU, who can obtain the maximum throughput, gets the right to use the channel. In addition, after obtaining the idle channel, the SU can estimate the remaining idle time of the channel by learning the channel state parameters online, thus avoiding unnecessary spectrum sensing by the SU at the beginning of each slot, thereby significantly improving the idle spectrum utilization. The channel state learning and utilization mechanism is easy to implement and has low overhead, which is convenient for application in practical systems.

Simulation analysis is performed on the method of the present disclosure to illustrate the beneficial effects.

The quantity M of channels in the system is 9, the quantity N of SUs is 4, and each channel has only one authorized PU. The busy duration and idle duration of the PU follow the exponential distributions with parameters $\lambda$ (idle) and $\mu$ (busy) respectively. The SUs attempt to access the primary channel in an overlay manner. In the slot/frame structure, it is assumed that the length $T_0$ of each slot is 50 ms and the time $\tau$ required for each SU to sense a channel is 3 ms. The transmission power of each SU is fixed at 23 dBm, the power of the additive white Gaussian noise is 1 mW, and the channel fading factor a is 3. In conflict avoidance, it is assumed that the parameter L=4 and the slot interval $T_1=100$, the information of each SU is aggregated to the central node for conflict detection every 100 slots. The SU spectrum usage conflict probability threshold $\eta$ is set to 10%, to be specific, if a channel conflict exceeds 10 slots, the conflict avoidance strategy is executed. In the simulation analysis, the optimization scheme proposed in this method is compared with three other schemes:

Scheme (1). $\varepsilon$-greedy strategy: the SU detects the channel in each slot, and then selects and accesses the channel according to the $\varepsilon$-greedy algorithm. A random number $\varepsilon$ decreases gradually with the increase of the simulation times, and the system does not execute the skipping strategy and conflict avoidance in the algorithm.

Scheme (2). Non-conflict avoidance strategy: The SU uses the step S3 in this method for channel selection and slot skipping, but no conflict avoidance strategy is executed.

Scheme (3). Fixed grouping strategy: A fixed quantity of channels are allocated to each SU before transmission. In the simulation analysis, the quantity of channels allocated to each SU is set to 4 and the channels are randomly allocated provided that each channel is used as the candidate channel by at most two SUs. The SU uses the step S3 in this method for channel selection and slot skipping, but no conflict avoidance strategy is executed.

Figure 4:
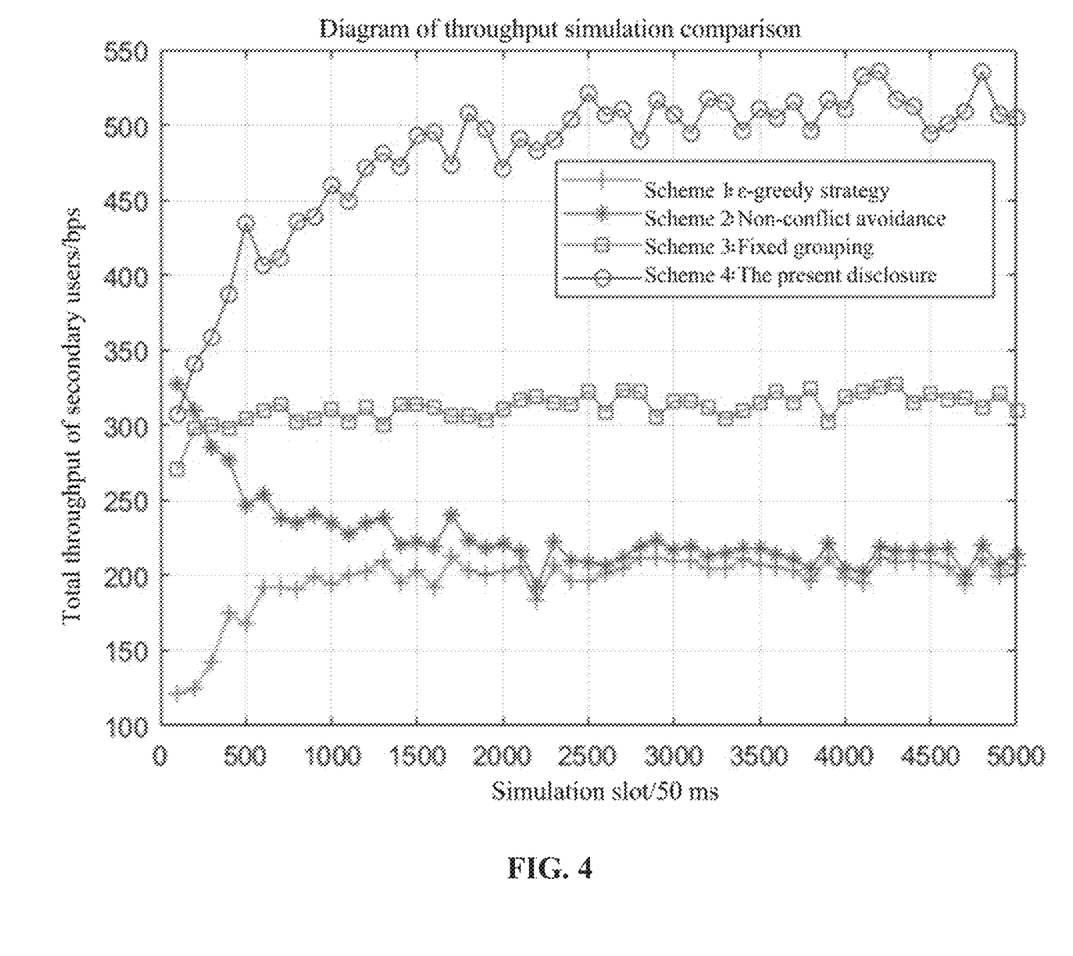
FIG. 4 is a diagram of simulation comparison between the effect of the prior art and the effect of the dynamic spectrum sharing method based on user online learning and low-overhead cooperation according to the present disclosure.

FIG. 4 compares the total throughput of the SU in different schemes. It can be seen that Scheme (1) and Scheme (2) obtain a lower system throughput due to the absence of conflict avoidance strategy. Scheme (3) adopts fixed grouping to reduce the channel occupancy conflict among the SUs and improve the throughput. However, the system throughput of Scheme (3) is limited because the throughput of a channel to different users is not considered and the grouping cannot maximize the support for SUs preferably selecting channels based on throughput. The optimized scheme in the present disclosure can converge to the optimum in a relatively short time of about 3000 slots, with a throughput increase of about 66%.

According to the comparison results of the simulation analysis, it can be found that the dynamic spectrum sharing method of the present disclosure reduces the spectrum resource wastes caused by channel competition while ensuring that an SU who can obtain the maximum throughput gets the right to use the channel, and avoid unnecessary spectrum sensing by the SU at the beginning of each slot, thereby significantly improving the idle spectrum utilization.

Each example of the present specification is described in a progressive manner, each example focuses on the difference from other examples, and the same and similar parts between the examples may refer to each other.

In this specification, several examples are used for illustration of the principles and implementations of the present disclosure. The description of the foregoing examples is used to help to illustrate the method of the present disclosure and the core principles thereof. In addition, those of ordinary skill in the art can make various modifications in terms of specific implementations and scope of application in accordance with the teachings of the present disclosure. In conclusion, the content of the present description shall not be construed as limitations to the present disclosure.

What is claimed is:

1. A dynamic spectrum sharing method based on user online learning and low-overhead cooperation, comprising:
    S1: obtaining, by a secondary user (SU), scenario information and requirement parameters of spectrum sharing, wherein obtaining, by the SU, the scenario information of spectrum sharing comprises: obtaining, by the SU, a sharable channel set M={1, . . . , M}, a SU set N={1, . . . , N} participating in spectrum sharing, a quantity L of candidate channels of each SU, a time τ required to sense each channel, and an interval $T_1$ at which the SU reports a channel usage to a secondary user base station (SUBS); and the requirement parameters comprise a spectrum usage conflict probability threshold η of the SU and a channel conflict adjustment parameter φ;
    S2: initializing, for each SU, state parameters and spectrum sensing parameters of each channel m∈M, wherein the state parameters of the channel comprise a first channel state parameter $\alpha_m$ and a second channel state parameter $\beta_m$, and the spectrum sensing parameters comprise a quantity $\kappa_m$ of slots skippable for channel sensing and a quantity $l_m$ of remaining slots skippable for channel sensing;
    S3: at a beginning of each slot, determining, by the SU, whether a direct transmission condition is met based on a transmission status of a previous slot; and continuing transmission directly on a channel of the previous slot when the direct transmission condition is met; or obtaining an idle channel for transmission based on a channel state and spectrum sensing when the direct transmission condition is not met, wherein obtaining the idle channel for transmission based on the channel state and spectrum sensing when the direct transmission condition is not met comprises:
    S31: calculating, by the SU, a current priority of each channel according to a formula $$P_{m,t} = \overline{x_{m,t}} + c\sqrt{\frac{\ln t}{h_{m,t}}},$$

wherein $P_{m,t}$ indicates a priority parameter, t indicates a number of a current slot, $\overline{x_{m,t}}$ indicates an average throughput obtained when the SU selects a channel m in previous t−1 slots, $h_{m,t}$ indicates a quantity of times the channel m is selected by the SU, and c is a constant;
    S32: arranging all channels in descending order of $P_{m,t}$ and taking first L channels as candidate channels of the SU;
    S33: sequentially performing, by the SU, spectrum sensing on the L candidate channels one by one, until the idle channel is obtained; obtaining a channel occupancy estimation parameter θ of a primary user (PU) through random sampling in a Γ distribution $\Gamma(\alpha_m, \beta_m)$ based on current values of the first channel state parameter $\alpha_m$ and the second channel state parameter $\beta_m$; and calculating the quantity $\kappa_m$ of slots skippable for channel sensing, wherein $\kappa_m$ is calculated by $$\kappa_m = \left\lceil \frac{1}{2T_0}\left(\frac{1}{\min(\theta, \alpha_m/\beta_m)}\right)\right\rceil,$$

wherein ⌈·⌉ indicates an upward rounding function, min(·) indicates a function for finding a smaller value, and $T_0$ indicates a slot length;
    S34: setting $l_m = \kappa_m$ and performing, by the SU, transmission on the obtained idle channel; and
    S35: skipping, by the SU, transmission, when no idle channel is sensed among the L candidate channels, and attempting transmission in a next slot;
    S4: updating the state parameters and the spectrum sensing parameters of the channel; and
    S5: reporting, by each SU, a channel occupancy status to the SUBS every $T_1$ slots, and performing, by the SUBS, conflict coordination based on the channel occupancy status.

2. The dynamic spectrum sharing method based on user online learning and low-overhead cooperation according to claim 1, wherein in the step S2, initializing the state parameters of each channel m∈M comprises:
    setting the first channel state parameter $\alpha_m = 1$;
    setting the second channel state parameter $\beta_m = T_0$, wherein $T_0$ indicates the slot length;
    initializing the spectrum sensing parameters of each channel m∈M comprises:
    setting the quantity of slots skippable for channel sensing $\kappa_m = 0$; and
    setting the quantity of remaining slots skippable for channel sensing $l_m = 0$.

3. The dynamic spectrum sharing method based on user online learning and low-overhead cooperation according to claim 2, wherein in the step S3, determining, by the SU, whether the direct transmission condition is met based on the transmission status of the previous slot comprises:
    determining that the direct transmission condition is met when the SU performs transmission successfully on a channel in the previous slot and the quantity $l_m$ of remaining slots skippable for channel sensing is greater than or equal to 1; otherwise, determining that the direct transmission condition is not met.

4. The dynamic spectrum sharing method based on user online learning and low-overhead cooperation according to claim 3, wherein in the step S3, continuing transmission directly on the channel of the previous slot when the direct transmission condition is met comprises:
    setting the parameter $l_m = l_m - 1$, and directly selecting, by the SU, the channel of the previous slot for transmission.

5. The dynamic spectrum sharing method based on user online learning and low-overhead cooperation according to claim 4, wherein in the step S4, updating the state parameters and the spectrum sensing parameters of the channel when continuing transmission directly on the channel of the previous slot when the direct transmission condition is met in the step S3 comprises:
    when the transmission succeeds and $l_m = 0$, setting $\beta_m = \beta_m + \kappa_m T_0$,
    when the transmission succeeds and $l_m \neq 0$, skipping updating the state parameters of the channel; or
    when the transmission fails, setting $\alpha_m = \alpha_m + 1$, $\beta_m = \beta_m + (\kappa_m - 1)T_0 + 0.5T_0$, and $l_m = 0$,
    wherein $\kappa_m$ is calculated by the formula $$\kappa_m = \left\lceil \frac{1}{2T_0} \left( \frac{1}{\min(\theta, \alpha_m/\beta_m)} \right) \right\rceil$$

after obtaining the channel occupancy estimation parameter θ of the PU through random sampling in the Γ distribution Γ($\alpha_m$, $\beta_m$) based on the current values of the first channel state parameter $\alpha_m$ and the second channel state parameter $\beta_m$.

6. The dynamic spectrum sharing method based on user online learning and low-overhead cooperation according to claim 5, wherein in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

7. The dynamic spectrum sharing method based on user online learning and low-overhead cooperation according to claim 4, wherein in the step S4, updating the state parameters and the spectrum sensing parameters of the channel when obtaining the idle channel for transmission based on the channel state and spectrum sensing when the direct transmission condition is not met in the step S3 comprises:
when the transmission succeeds, setting $\beta_m = \beta_m + \kappa_m T_0$, and $l_m = l_m - 1$; or
when the transmission fails, setting $l_m = \kappa_m = 0$, $\alpha_m = \alpha_m + 1$, and $\beta_m = \beta_m + (\kappa_m - 1)T_0 + 0.5T_0$.

8. The dynamic spectrum sharing method based on user online learning and low-overhead cooperation according to claim 7, wherein in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

9. The dynamic spectrum sharing method based on user online learning and low-overhead cooperation according to claim 4, wherein in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

10. The dynamic spectrum sharing method based on user online learning and low-overhead cooperation according to claim 2, wherein in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

11. The dynamic spectrum sharing method based on user online learning and low-overhead cooperation according to claim 3, wherein in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

12. The dynamic spectrum sharing method based on user online learning and low-overhead cooperation according to claim 1, wherein in the step S5, performing, by the SUBS, the conflict coordination based on the channel occupancy status comprises:
adjusting, by the SUBS, a return value of the channel to the SU based on the channel occupancy status; and
when a probability of a channel being occupied by two or more SUs at the same time in $T_1$ slots is greater than the conflict probability threshold η, decreasing average return values by φ for the SUs selecting the channel except an SU with a largest average return value, and feeding back a new return value to each SU.

13. The dynamic spectrum sharing method based on user online learning and low-overhead cooperation according to claim 12, wherein in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

14. The dynamic spectrum sharing method based on user online learning and low-overhead cooperation according to claim 1, wherein in the step S1, the quantity of the candidate channels of each SU is determined based on a channel occupancy status of the PU and an expected probability of obtaining an available channel per access attempt, and the time required to sense each channel is determined based on a protection requirement of the PU and a sensing capability of the SU.

\* \* \* \* \*